June 5, 1951   P. CALDWELL ET AL   2,556,064
PRODUCTION OF POTASSIUM SILICOFLUORIDE
Filed May 22, 1946
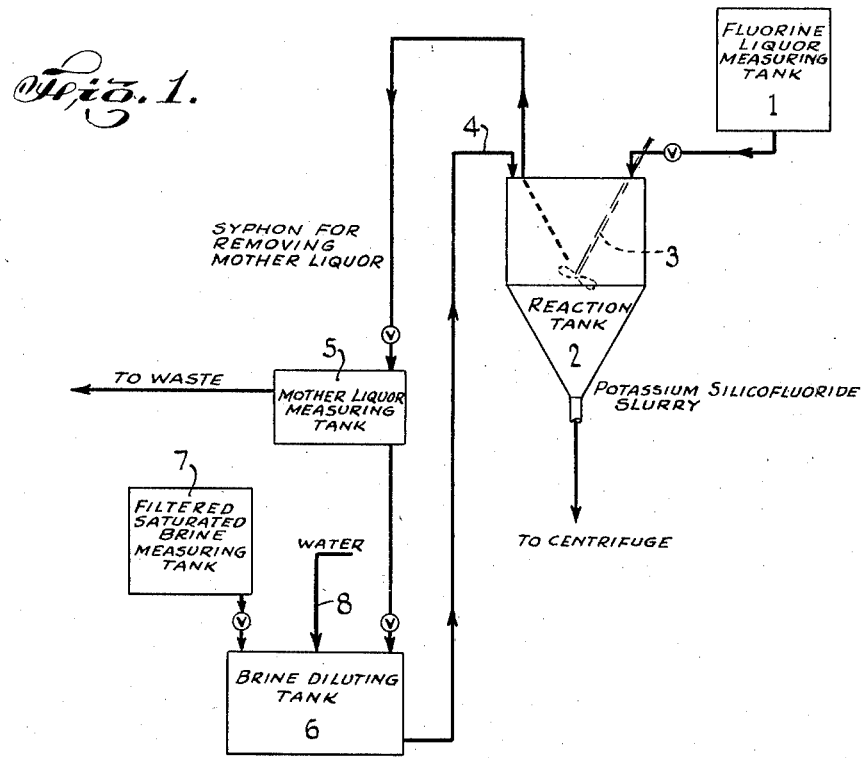
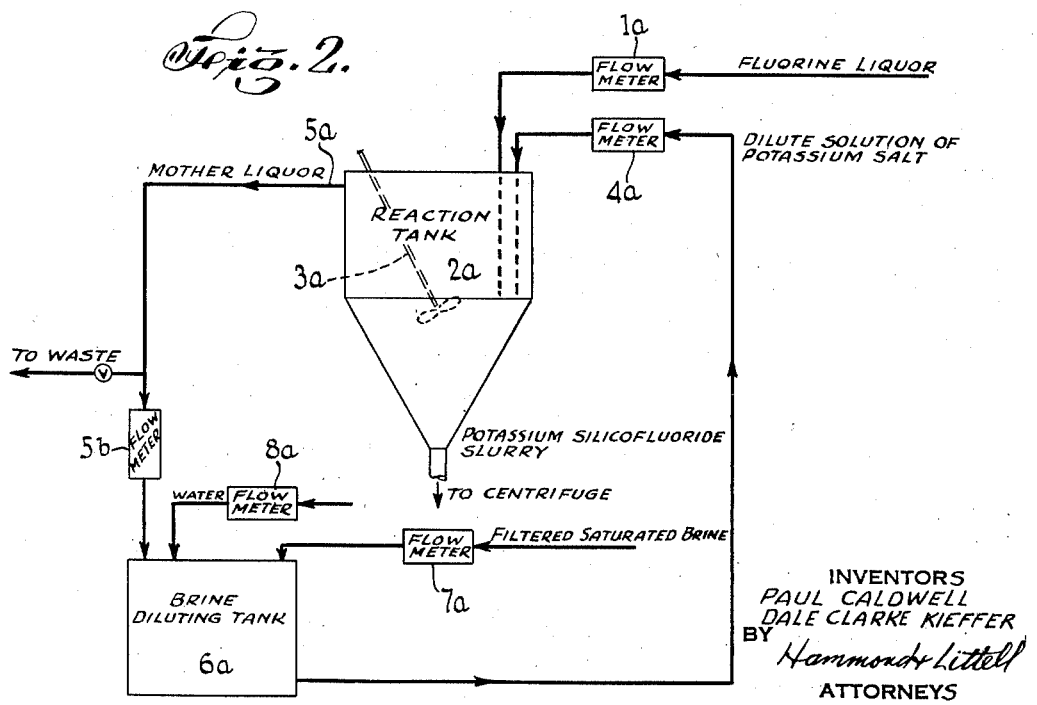
INVENTORS
PAUL CALDWELL
DALE CLARKE KIEFFER
BY Hammond & Littell
ATTORNEYS Patented June 5, 1951

2,556,064

UNITED STATES PATENT OFFICE 2,556,064

PRODUCTION OF POTASSIUM SILICOFLUORIDE

Paul Caldwell, Portlock, and Dale Clarke Kieffer, Norfolk, Va., assignors to Smith-Douglass Company, Inc., Norfolk, Va., a corporation of Virginia Application May 22, 1946, Serial No. 671,440

5 Claims. (Cl. 23—88)

This invention relates to the production of potassium silicofluoride.

The reaction of water with silicon fluoride ($SiF_4$) yields fluosilicic acid liquor, sometimes called "fluorine liquor," which is a solution of fluosilicic acid ($H_2SiF_6$) containing silica in suspension. Fluorine liquor is commonly produced in connection with superphosphate manufacture, by absorbing in water gases generated in superphosphate dens. When a saturated solution or brine of commercial sodium chloride is added to fluorine liquor, a reaction yielding sodium silicofluoride ($Na_2SiF_6$) and hydrochloric acid occurs. The sodium silicofluoride develops as crystals which settle to the bottom of their mother liquor. By appropriate separation, such as decanting the supernatant liquor, centrifuging the residual slurry and washing and drying the crystals, commercial sodium silicofluoride may be readily obtained.

In attempts to apply this known procedure for the production of potassium silicofluoride ($K_2SiF_6$), by adding to the fluosilicic acid liquor a brine of potassium salt, such as commercial potassium chloride, instead of sodium chloride, a reaction yielding potassium silicofluoride occurs, but the potassium silicofluoride develops in a highly dispersed state as a substantially unfilterable or colloidal gel that is difficult if not impossible to separate from the motor liquor. Though this gelatinous form of potassium silicofluoride be separated and dried painstakingly, it is difficult to handle or use, and it is even unsuitable for certain industrial uses that require briquetted material, because briquettes made of it disintegrate when subjected to roasting treatment.

The principal object of this invention is to provide a process whereby the reaction of fluosilicic acid with potassium chloride to produce potassium silicofluoride is made to yield the potassium silicofluoride in a distinctly crystalline form, which enables the product to be isolated readily from its mother liquor and makes possible the commercial production of potassium silicofluoride in a controlled and economical manner.

Another object is to provide a process for enhancing the size of formation, and hence the filterability, of the potassium silicofluoride crystals.

Another object of the invention is to provide an improved crystalline form of commercial potassium silicofluoride that can be compressed into briquettes which retain their shape under rough handling conditions and which withstand heat or roasting treatment without disintegrating, so that a product serving important industrial needs is obtained.

A further object of the invention is to provide a cyclical process for the commercial production of crystalline potassium silicofluoride, by which economies of process materials and heat may be achieved. And yet another object is to adapt said process for practical use in a continuous manner, as well as by batch operations.

The present invention is based upon the discovery that the development of potassium silicofluoride in a gelatinous state when following the procedure above mentioned is attributable to a dispersing or peptizing effect of concentrated solutions, or brines, made of commercial potassium salts such as potassium chloride, and the invention utilizes the further discovery that the potassium silicofluoride will develop and can be isolated easily in a distinctly crystalline, nongelatinous form if to a suitable aqueous solution or liquor of fluosilicic acid there is added a dilute aqueous solution of potassium chloride or other suitable salt that is substantially free of the insoluble impurities normally present in the commercal form of said salt.

When dilute solutions of commercial potassium salts are used for the reaction without any previous purification the gelatinous form of potassium silicofluoride still occurs, and it occurs also when potassium salt brines that have been filtered to remove suspended impurities are used in concentrated or substantially saturated form. The desired easily filterable, crystalline form of potassium silicofluoride can be obtained, however, by the use of dilute solutions of commercial potassium salts from which insoluble matter previously has been removed by filtration or the like.

A crystalline product easy to separate from the mother liquor and easy to dry can be obtained, for example, by reacting the fluosilicic acid solution or liquor with a filtered aqueous solution of commercial potassium chloride containing about 30 grams of the salt per liter. On the other hand, a gelatinous product results when the solution contains about 40 grams of potassium chloride per liter or a higher concentration. In general, satisfactory results can be achieved by keeping the concentration of the potassium chloride solution within a maximum limit of about 35 grams per liter, and concentrations of about 30 grams per liter, more or less, preferably are used for the best results. Although still lower concentrations, or greater dilutions, also yield easily filterable crystals, they may add unnecessarily to the volume of liquids to process and to the amount of potassium silicofluoride lost in solution in the mother liquor.

It has been discovered, further, that temperatures exert an important influence upon the formation of crystalline potassium silicofluoride by the process above disclosed, and that increasing the temperature of the reacting solutions above a certain minimum affords a means of enhancing the size of the crystals that form. Difficulty in separating and drying the product generally results if the temperature of the reacting solutions is below about 70° F. At higher temperatures, however, potassium silicofluoride crystals of readily filterable size are formed, which appear under a microscope to be entirely free of the presence of gel. By carrying out the reaction at about 95° F. or above, crystals several times larger than those yielded at 70° F. may be obtained.

The principles above described may be utilized, according to preferred embodiments of the invention, by making a concentrated solution or brine of commercial potassium chloride, filtering it, then diluting it to a concentration of about 30 grams of potassium chloride, more or less, per liter with aqueous liquid that is substantially free of insoluble impurities, heating the dilute solution to about 115° F., and then adding it to a solution or liquor of fluosilicic acid at about room temperature, say 70° F. Higher temperatures below boiling can be used with like effect, though at an unnecessary expense for heat. The liquids are agitated while being added together, and filterable potassium silicofluoride crystals immediately form which require only a few minutes to settle to the bottom of the mother liquor. They may be isolated by filtration or, preferably, by the procedure used in producing sodium silicofluoride, i. e., allowing the crystals to settle, decanting the supernatant mother liquor, centrifuging the residual slurry, washing and partially drying the crystals in the centrifuge, and then drying them completely in any suitable manner. A commercially pure, dry, crystalline form of potassium silicofluoride results, the average analysis of which is about 98.0% potassium silicofluoride.

It has been found advantageous to use a substantially clear fluosilicic solution or fluorine liquor, rather than the cloudy fluorine liquor containing suspended silica that results directly from the reaction of silicon fluoride with water. A clear liquor is obtained by filtering out or otherwise removing the silica. Although the cloudy fluorine liquor yields a crystalline product that settles well with a good layer separation, the small amount of adsorbed silica contaminates the product and raises the water content of the centrifuged product.

The influences of dilution, temperature and suspended impurities upon the results achieved pursuant hereto are somewhat relative. For example, the use of a highly dilute solution of potassium salt, such as one containing substantially less than 30 grams of KCl per liter, will permit the use of relatively lower temperatures or the presence of relatively larger amounts of insoluble impurities than otherwise would permit the attainment of the required results. Similarly, the use of relatively high reaction temperatures ranging upward from 95° F. will permit the use of relatively more concentrated solutions of potassium salt, or the presence of larger amounts of insoluble impurities, than otherwise would be feasible.

It has been found, further, that the production of substantially pure, crystalline potassium silicofluoride according to the foregoing principles can be carried out satisfactorily in continuing commercial operations by utilizing some of the mother liquor separated from the reaction product in one batch or phase of the operations, together with an added amount of clear water, in preparing the dilute solution of potassium salt to be used for a succeeding batch or phase of the operations. The dilute solution so prepared by recycling mother liquor yields a satisfactory crystalline product that filters and dries well, even though it contain substantial concentrations of hydrochloric or other acid and other soluble impurities that tend to reduce crystal size.

For the best results, not more than 55% of the volume of the dilute solution should be composed of recycled mother liquor, and the recycling should not be continued so long that impurities accumulate to an intolerable extent. A satisfactory practice is to re-start the cyclical process each day by making and using a fresh solution of filtered potassium salt brine diluted entirely with clear water. The recycling practice, properly controlled, gives advantages under many practical conditions, in that a larger amount of the unreacted excess of potassium salt may be recovered by the action of "salting out" from the discarded mother liquor, the amount of heat required to impart the desired temperature to the dilute solution is reduced, and the amounts of clear water required for the process are reduced. The potassium salt generally is used in some excess, and since it is expensive the advantage first mentioned involves a considerable saving.

While we have referred mainly to the use of potassium chloride in the practice of our invention, because it is the potassium salt most available and most likely to be employed, substantially any of the many water-soluble acid and normal salts of potassium also can be used according to the same principles; for example, potassium sulfate, potassium nitrate, potassium bromide, potassium iodide, potassium acid carbonate, potassium acid sulfate, etc. The dilute solutions of these other salts should be made to contain the same quantities of potash per liter, calculated as potassium, as are effective in the use of dilute solutions of potassium chloride under comparable conditions. This is to say that the dilute potassium salt solution usually should contain not more than about 19 grams of potash, calculated as potassium, per liter, and that a concentration of about 16 grams of potassium per liter, more or less, represents the practice presently preferred, subject of course to variations according to the size of crystal formation desired and the prevailing adjustment of the relative influences described above.

The following examples further illustrate satisfactory embodiments of this invention for the commercial production of potassium silicofluoride. Reference is made to the accompanying drawing, forming a part hereof, in which Fig. 1 is a diagrammatic flow chart showing the process adapted for batch operation, and Fig. 2 is a diagrammatic flow chart showing the process adapted for continuous operation.

Referring to Fig. 1, two hundred and sixteen (216) gallons of clear liquor containing about 215 grams of fluosilicic acid per liter are delivered from a measuring tank 1, while at room temperature, into a reaction tank 2 equipped with an agitator 3, and the agitator is started. One thousand and fifty-five (1055) gallons of a dilute solution of filtered potassium chloride brine, prepared as described below to contain about 30 grams of KCl per liter, and heated to 115° F., are added through line 4 to the clear liquor in the reaction tank, while agitating. When all the dilute solution has been added, the batch is allowed to settle five minutes. Then the supernatant mother liquor is siphoned or decanted from the reaction tank into measuring tank 5, from which 636 gallons of the mother liquor is sent to a diluting tank 6, while the remainder of the supernatant mother liquor is discarded to waste. The residual slurry in the reaction tank is discharged to a centrifuge in which the crystals are purged, washed with clear water, and spun to a nearly dry state. The centrifuged crystals then are passed through a rotary drum drier, from which they issue as dry, commercially pure, crystalline potassium silicofluoride.

At the start of each day's operations, the dilute solution of potassium chloride is prepared by combining about 181 gallons of filtered saturated potassium chloride brine (containing about 300 grams of KCl per liter), as obtained from measuring tank 7, in the diluting tank 6 with enough clear water, admitted at 8, to make about 1055 gallons of dilute solution that contains about 30 grams of KCl per liter. This dilute solution is heated to 115° F. and used for the first batch reaction, as above described. The 636 gallons of mother liquor removed from the batch through tank 5 to the diluting tank 6 is then used to make a further batch of dilute KCl solution by adding about 181 gallons of saturated brine from tank 7 as aforesaid and also enough clear water at 8 to obtain another 1055 gallons of dilute solution, which in turn is heated to 115° F. and used for the next batch reaction. The recycling of mother liquor decanted from one batch as part of the dilute solution used for the next batch reaction is continued until the end of the day's operations, when all of the mother liquor decanted from the last batch is sent to waste.

In the continuous operations shown diagrammatically in Fig. 2, the concentrations and proportions of the reagents used may be the same as in the example of batch operations. At the start, a quantity of dilute solution having the desired concentration of potassium salt is prepared and heated to the desired temperature in diluting tank 6a. Clear fluorine liquor is fed at a regulated rate through a flow meter 1a into reaction tank 2a where agitator 3a is working, while the dilute solution is fed from tank 6a into the reaction tank 2a through a flow meter 4a, at a rate regulated so as to furnish enough potash in solution for reaction with all the fluosilicic acid in the liquor, and some excess. These reagents are introduced at a distance sufficiently below the overflow line 5a, by which mother liquor is decanted, to assure that they will react completely and that the potassium silicofluoride crystals formed will settle from the mother liquor before it reaches the overflow. As the reaction and the inflow of reagents proceed in tank 2a, all the excess mother liquor is drawn or decanted from that tank through line 5a, and a proportion of the mother liquor, as desired for the recycling practice, is passed through flow meter 5b into the diluting tank 6a, the remainder being sent to waste. At the same time, proportionate streams of clear saturated brine and clear water are fed through flow meters 7a and 8a, respectively, into the diluting tank so as to maintain continuously therein a supply of dilute solution having the desired potash concentration and heated to the desired temperature.

Meanwhile, a slurry of potassium silicofluoride crystals in mother liquor is drawn continuously from the bottom or discharge end of the reaction tank 2a and sent to a centrifuge or filter station for separation of the crystals, after which the crystals may be dried completely in any desired manner.

The crystalline potassium silicofluoride produced according to our invention can be made into briquettes by usual briquetting procedures, and the briquettes so obtained possess the valuable quality of withstanding heat and roasting treatment without disintegrating, whereas briquettes made of the gelatinous potassium silicofluoride heretofore produced fly apart in the ovens when subjected to the same roasting conditions.

Various modifications and substitutions of the details and examples set forth hereinabove will become apparent to those skilled in the art and may be resorted to without departing from the invention, which is intended to be defined by the appended claims.

We claim:

1. A process for producing potassium silicofluoride which comprises reacting at a temperature not substantially below 95° F. an aqueous solution of fluosilicic acid substantially free of silica with a dilute aqueous solution of potassium chloride containing not more than about 35 grams of potassium chloride per liter and substantially free of the insoluble impurities normally present in commercial potassium chloride, so that potassium silicofluoride crystals readily separable from their mother liquor are formed.

2. A process for producing potassium silicofluoride which comprises providing at about room temperature a solution of fluosilicic acid constituting a reaction product of silicon fluoride and water from which silica has been removed, providing a dilute solution of potassium chloride containing not more than about 35 grams of potassium chloride per liter, heated to at least about 115° F. and substantially free of the insoluble impurities normally present in commercial potassium chloride, adding to said fluosilicic acid solution, while agitating it, enough of said dilute solution to react with all the fluosilicic acid present, so that potassium silicofluoride crystals readily separable from their mother liquor are formed, and isolating said crystals.

3. A cyclical process for producing potassium silicofluoride which comprises adding to a substantially silica-free fluosilicic acid liquor a dilute aqueous solution of potassium chloride containing not more than about 35 grams of potassium chloride per liter and heated to at least about 115° F. and substantially free of the insoluble impurities normally present in commercial potassium chloride, so that potassium silicofluoride crystals readily separable from their mother liquor are formed, separating the crystals from the mother liquor, and continuing operations as aforesaid with the use of a dilute solution as aforesaid in which the diluent is composed partly of mother liquor from which the crystals previously were separated and partly of clear water.

4. A cyclical process for producing potassium silicofluoride which comprises providing a batch of substantially silica-free fluorine liquor at about room temperature, adding to said batch a batch of a dilute aqueous solution of potassium chloride containing at least enough potassium chloride to react with the fluosilicic acid in said liquor, said solution having a concentration of not more than about 35 grams of potassium chloride per liter, being heated to at least about 100° F. and being substantially free of the insoluble impurities normally present in commercial potassium chloride, so that potassium silicofluoride crystals readily separable from their mother liquor are formed, separating the crystals from the mother liquor, and repeating the said operations successively upon successive batches of liquor as aforesaid with the use of successive batches of dilute solution as aforesaid in each of which the diluent is composed partly of mother liquor from which the crystals previously were separated and partly of clear water.

5. A process for producing potassium silicofluoride which comprises continuously introducing into a reaction zone having an overflow point regulated streams of an aqueous solution of fluosilicic acid substantially free of silica and a clear dilute aqueous solution of potassium chloride containing not more than about 35 grams of KCl per liter and heated to at least about 115° F., mixing said streams at a level below said overflow point so that they react at such level to yield potassium silicofluoride crystals that settle to the bottom of said zone, continuously decanting excess mother liquor from said zone at said overflow point, and removing a slurry of potassium silicofluoride crystals from the bottom of said zone as desired.

PAUL CALDWELL.
DALE CLARKE KIEFFER.

REFERENCES CITED

The following references are of record in the file of this patent:

UNITED STATES PATENTS

| Number | Name | Date |
| --- | --- | --- |
| 1,247,165 | Stahl | Nov. 20, 1917 |
| 1,581,819 | Siegel | Apr. 20, 1926 |
| 1,634,122 | Stevenson | June 28, 1927 |
| 2,354,177 | Kawecki | July 18, 1944 |
| 2,447,359 | Oakley | Aug. 17, 1948 |

FOREIGN PATENTS

| Number | Country | Date |
| --- | --- | --- |
| 222,838 | Great Britain | June 25, 1925 |
| 271,816 | Great Britain | Nov. 3, 1927 |

OTHER REFERENCES

"Condensed Chemical Dictionary," 1st. ed., 1919, Turner. The Chem. Catalog Co., N. Y., pages 385 and 388.

"A Comprehensive Treatise on Inorganic Chemistry," by J. W. Mellor, 1925 ed., vol 6, page 947. Longmans, Green & Co., N. Y.

Hackh's "Chemical Dictionary," 2nd. ed., page 745. P. Blakiston's Son & Co., Philadelphia.